(12) United States Patent
Hasegawa et al.

(10) Patent No.: US 8,452,234 B2
(45) Date of Patent: May 28, 2013

(54) COMMUNICATION SYSTEM AND RECEIVER USED IN COMMUNICATION SYSTEM

(75) Inventors: Kazuo Hasegawa, Gunma-ken (JP); Hirohisa Suzuki, Gunma-ken (JP)

(73) Assignees: Sanyo Semiconductor Co., Ltd. (JP); Semiconductor Components Industries, LLC, Phoenix, AZ (US)

( * ) Notice: Subject to any disclaimer, the term of this patent is extended or adjusted under 35 U.S.C. 154(b) by 1017 days.

(21) Appl. No.: 12/484,817

(22) Filed: Jun. 15, 2009

(65) Prior Publication Data
US 2009/0309708 A1 Dec. 17, 2009

(30) Foreign Application Priority Data
Jun. 13, 2008 (JP) .................. 2008-155013

(51) Int. Cl.
H04B 5/00 (2006.01)
(52) U.S. Cl.
USPC ........................................ 455/41.1; 455/41.2
(58) Field of Classification Search
USPC .................... 455/41.1, 41.2, 41.3
See application file for complete search history.

(56) References Cited

U.S. PATENT DOCUMENTS

| | | | | |
|---|---|---|---|---|
| 5,914,701 A * | 6/1999 | Gersheneld et al. | ......... | 345/156 |
| 6,104,913 A * | 8/2000 | McAllister | ................ | 455/41.1 |
| 6,211,799 B1 | 4/2001 | Post et al. | | |
| 6,223,018 B1 * | 4/2001 | Fukumoto et al. | ........ | 455/41.1 |
| 6,859,657 B1 * | 2/2005 | Barnard | .................. | 455/575.6 |
| 6,965,842 B2 * | 11/2005 | Rekimoto | .................. | 702/150 |
| 7,509,092 B2 * | 3/2009 | Ishibashi et al. | ............. | 455/41.1 |
| 7,860,455 B2 * | 12/2010 | Fukumoto et al. | ........... | 455/41.1 |
| 2008/0261523 A1 * | 10/2008 | Kubono et al. | ............. | 455/41.1 |
| 2009/0325485 A1 * | 12/2009 | Hasegawa et al. | .......... | 455/41.1 |

FOREIGN PATENT DOCUMENTS

| | | |
|---|---|---|
| JP | 2001-308803 A | 11/2001 |
| JP | 2002-9710 A | 1/2002 |
| JP | 2008-27219 A | 2/2008 |

OTHER PUBLICATIONS

The First Office Action for Chinese Patent Application No. 200910159539.0, issued Mar. 12, 2012, with English translation.
"Personal Area Networks (PAN): Near-Field Intra-Body Communication", Thomas Guthrie Zimmerman, B.S., Humanities and Engineering Massachusetts Institute of Technology (1980).
Nikkei Electronics Jun. 2, 1997 (No. 690) pp. 141-148, Corresponds to English Version Referenced in Non-Patent Literature Documents, Cite No. 1.
Notice of Grounds for Rejection for Japanese Patent Application No. 2008-155013, mailed Oct. 30, 2012, with English translation.
Notice of Grounds for Rejection for Patent Application Serial No. 2008-155013, mailed Jul. 24, 2012, with English translation.

* cited by examiner

*Primary Examiner* — Lewis West
(74) *Attorney, Agent, or Firm* — Cantor Colburn LLP

(57) ABSTRACT

A communication system is provided comprising a living body-side electrode which primarily capacitively couples with a living body, an environment-side electrode which primarily capacitively couples with an external environment, and a circuit board on which a circuit which processes a signal which is output from at least one of the living body-side electrode and the environment-side electrode is mounted, wherein the circuit board is not placed between the living body-side electrode and the environment-side electrode.

5 Claims, 20 Drawing Sheets

COMMUNICATION SYSTEM AND RECEIVER USED IN COMMUNICATION SYSTEM

CROSS-REFERENCE TO RELATED APPLICATIONS

The entire disclosure of Japanese Patent Application No. 2008-155013 including specification, claims, drawings, and abstract is incorporated herein by reference.

BACKGROUND OF THE INVENTION

1. Field of the Invention

The present invention relates to a communication system for enabling communication through a human body or the like and a receiver used in the communication system.

2. Description of the Related Art

A communication device which communicates through tissue of a living body such as a human body is known. For example, a technique is known in which data can be exchanged by a user merely holding a hand over a receiver while a portable electronic device such as a portable phone on which a transmitter is mounted is placed in a pocket of clothing of the user, or while the portable electronic device is hung from the neck.

For example, as shown in FIGS. 10A and 10B, a transmitter 100 comprises an encoder 10, a transmission amplifier 12, an environment-side electrode 14, and a living body-side electrode 16, and a receiver 102 comprises a decoder 18, a reception amplifier 20, an environment-side electrode 22, and a living body-side electrode 24. The transmitter 100 is mounted on a portable electronic device or the like which is carried by the user. The receiver 102 is placed on a ticket barrier of a station, a vending machine, a shop, etc.

FIG. 11 shows a relationship between the transmitter 100, the receiver 102, and the human body or the like during the communication. FIG. 12 shows an equivalent circuit of the relationship.

The transmitter 100 capacitively couples with the receiver 102 through tissue of a living body such as human body or the like (hereinafter simply referred to as "human body or the like"). The environment-side electrode 14 of the transmitter 100 forms a capacitive coupling A with an external environmental ground potential, a capacitive coupling B with the human body or the like, and a capacitive coupling D with an external environment. Similarly, the environment-side electrode 22 of the receiver 102 forms a capacitive coupling H with the external environmental ground potential and a capacitive coupling G with the external environment. As described, the environment-side electrodes 14 and 22 are electrodes which form capacitive couplings with the external environment during the communication.

The living body-side electrode 16 of the transmitter 100 forms a capacitive coupling C with the human body or the like. The living body-side electrode 24 of the receiver 102 forms a capacitive coupling F with the human body or the like. Moreover, a capacitive coupling E is formed between the human body or the like and the external environment. As described, the living body-side electrodes 16 and 24 are electrodes which form capacitive couplings with the human body or the like during the communication.

The transmission amplifier 12 of the transmitter 100 receives information encoded by the encoder 10 and outputs as a potential difference between the environment-side electrode 14 and the living body-side electrode 16. When the transmitter 100 and the receiver 102 are electrically coupled through the human body or the like as described above, the potential difference between the environment-side electrode 14 and the living body-side electrode 16 of the transmitter 100 causes a change in a potential difference between the environment-side electrode 22 and the living-body side electrode 24 of the receiver 102. The reception amplifier 20 of the receiver 102 amplifies the potential difference between the environment-side electrode 22 and the living body-side electrode 24 and outputs the amplified signal. The output of the reception amplifier 20 is decoded by the decoder 18. In this manner, the communication is established.

For example, communication is enabled by a user who carries the transmitter 100 holding a hand over (or contacting with a hand) the living body-side electrode 24 of the receiver 102 placed on a ticket barrier of a station.

In a portable terminal such as a portable phone and a PDA in the related art, as shown by a cross sectional diagram of FIG. 13, the environment-side electrode 14 and the living body-side electrode 16 are placed attached to an internal surface of a housing of the portable terminal and a circuit board 26 on which the reception amplifier 20, the decoder 18, etc. which process the signals from the environment-side electrode 14 and the living body-side electrode 16 are mounted is placed in the housing. In this process, in order to prevent influences of electromagnetic waves emitted from the circuit board 26 on the signals received on the environment-side electrode 14 and the living body-side electrode 16, a structure is employed in which the circuit board 26 is stored in a shield case 28 made of a conductor.

When a structure of storing the circuit board 26 in the shield case 28 is employed, the manufacturing cost is increased by the shield case 28, and in addition, as shown in an equivalent circuit of FIG. 14, the intensity of the signal which can be detected from the environment-side electrode 14 and the living body-side electrode 16 is reduced due to influences of parasitic capacitances C1 and C2 between the environment-side and living body-side electrodes 14 and 16 and the shield case 28.

In consideration of this, another configuration is employed in which, as shown in a cross sectional diagram of FIG. 15, the circuit board 26 is not stored in the shield case 28, but is placed between the environment-side electrode 14 and the living body-side electrode 16.

For example, when a reception signal as shown in FIG. 16A is obtained in the structure of FIG. 13, in a structure having a similar system but with the shield case 28 removed as shown in FIG. 15, the reception signal of FIG. 16B is obtained.

Thus, the shield case 28 becomes unnecessary and the parasitic capacitance between the environment-side and living body-side electrodes 14 and 16 and the circuit board 26 becomes smaller compared to the case where the shield case 28 is provided, so that the absolute intensity of the reception signal can be increased, but the electromagnetic waves transmitted from the circuit board 26 are superposed as noise on the signal received at the environment-side electrode 14 and the living body-side electrode 16, and the S/N ratio is degraded.

In particular, as the size of the portable terminal is reduced and the distance between the environment-side and living body-side electrodes 14 and 16 and the circuit board 26 is reduced, the influence of the electromagnetic noise transmitted from the circuit board 26 becomes more significant, and the problem of reduction in the S/N of the reception signal becomes more significant.

SUMMARY OF THE INVENTION

According to one aspect of the present invention, there is provided a communication system for enabling communication between a transmitter which is portable and a receiver which is fixed, using a capacitive coupling through a living body, wherein the receiver comprises a living body-side electrode which primarily capacitively couples with a living body, an environment-side electrode which primarily capacitively couples with an external environment, and a circuit board on which a circuit which processes a signal which is output from at least one of the living body-side electrode and the environment-side electrode is mounted, and the circuit board is not placed between the living body-side electrode and the environment-side electrode.

BRIEF DESCRIPTION OF THE DRAWINGS

Preferred embodiments of the present invention will be described in detail based on the following drawings, wherein.

DESCRIPTION OF THE PREFERRED EMBODIMENTS

Figure 1:
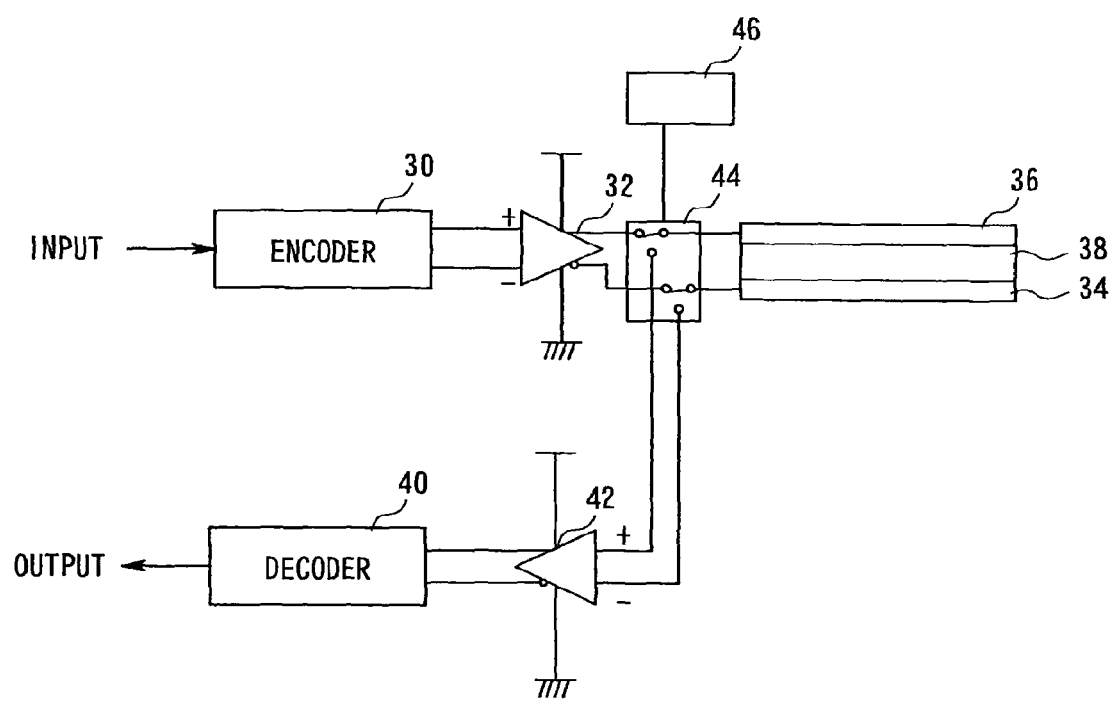
FIG. 1 is a diagram showing a structure of a transceiver in a communication system in a preferred embodiment of the present invention.

As shown in a circuit diagram of FIG. 1, a transceiver 200 of a communication system of a preferred embodiment of the present invention comprises an encoder 30, a transmission amplifier 32, an environment-side electrode 34, a living body-side electrode 36, a decoder 40, a reception amplifier 42, a changeover switch 44, and a controller 46.

The transceiver 200 can be incorporated into a portable electronic device such as a portable phone and a PDA, and used as a portable communication terminal. In addition, the transceiver 200 may be placed in infrastructures such as a ticket barrier in a station, a vending machine, a shop, etc., and used as a communication terminal.

For example, users carrying portable communication terminals on each of which the transceiver 200 is mounted may contact or closely place a part of the body, to exchange information between the transceivers 200. In addition, a user carrying the portable communication terminal on which the transceiver 200 is mounted may contact or closely place a part of the body to the living body-side electrode 36 of the transceiver 200 placed in an infrastructure such as a ticket barrier, to exchange data between the transceivers 200.

The encoder 30 encodes data which is input from the outside using a predetermined encoding method and outputs the encoded data to the transmission amplifier 32. The data which is input from the outside is input in a superposed state on a base wave of a high frequency. The frequency of the base wave is preferably set, for example, to 5 MHz or higher or 15 MHz or lower.

The transmission amplifier 32 comprises a differential amplifier circuit. An inverted input terminal (−) and a non-inverted input terminal (+) of the differential amplifier circuit are connected to an output terminal of the encoder 30. An inverted output terminal and a non-inverted output terminal of the transmission amplifier 32 are connected to the environment-side electrode 34 and the living body-side electrode 36 through the changeover switch 44. In the state where the inverted output terminal and the non-inverted output terminal of the transmission amplifier 32 are connected to the environment-side electrode 34 and the living body-side electrode 36 by the changeover switch 44, the transmission amplifier 32 amplifies a signal which is input from the encoder 30 and differentially outputs to the environment-side electrode 34 and the living body-side electrode 36. A potential difference between the environment-side electrode 34 and the living body-side electrode 36 changes according to the output of the transmission amplifier 32.

The environment-side electrode 34 and the living body-side electrode 36 are each formed with a conductor. For example, these electrodes are formed in a sheet shape or a plate shape with a conductor such as aluminum, stainless steel, copper foil, copper sheet, etc. The environment-side electrode 34 and the living body-side electrode 36 are preferably placed in a state electrically insulated from each other, sandwiching a dielectric layer 38.

The reception amplifier 42 comprises a differential amplifier circuit. An inverted input terminal (−) and a non-inverted input terminal (+) of the differential amplifier circuit are connected to the environment-side electrode 34 and the living body-side electrode 36 through the changeover switch 44. An inverted output terminal and a non-inverted output of the differential amplifier circuit are connected to an input terminal of the decoder 40. In the state where the inverted input terminal (−) and the non-inverted input terminal (+) of the reception amplifier 42 are connected to the environment-side electrode 34 and the living body-side electrode 36 by the changeover switch 44, the reception amplifier 42 amplifies a potential difference between the environment-side electrode 34 and the living body-side electrode 36 and outputs as a potential difference between the inverted output terminal and the non-inverted output terminal. The decoder 40 receives an output signal from the reception amplifier 42, decodes the signal using a decoding method corresponding to the encoding method used in the encoder 30, and outputs the decoded signal.

In the transceiver 200, the environment-side electrode 34 and the living body-side electrode 36 are shared between transmission and reception. The controller 46 switches the changeover switch 44 to the transmission amplifier 32 when data is to be transmitted and switches the changeover switch 44 to the reception amplifier 42 when data is to be received. The timing of the switching of the changeover switch 44 may be at a predetermined time period or may be achieved by the user.

Figure 2:
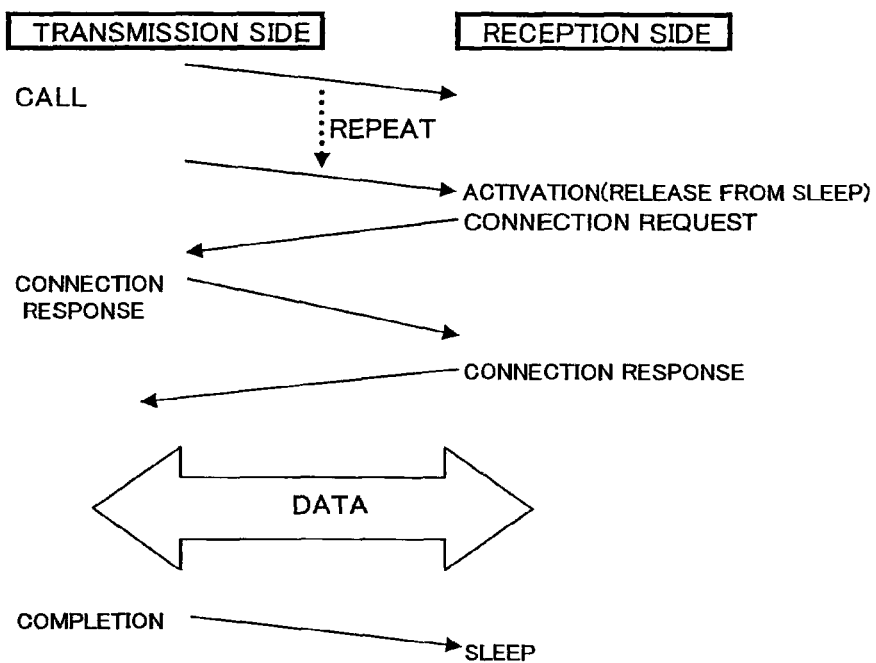
FIG. 2 is a diagram for explaining a communication session using a transceiver of a preferred embodiment of the present invention.

For example, as shown in FIG. 2, a communication session can be executed by executing a polling process. In the following description, the transceivers 200 provided in the fixed device and the portable device periodically switch between the transmission state and the reception state at a predetermined period.

The transceiver 200 which is at a transmission side sends a call to the transceiver 200 which is at a reception side. When there is no transceiver 200 of the reception side in the reception range of the calling signal from the transceiver 200 of the transmission side, the call is repeated. When, on the other hand, the transceiver 200 of the reception side can receive the calling signal from the transceiver 200 of the transmission side, the transceiver 200 of the reception side receiving the calling signal is activated. The activated transceiver 200 of the reception side transmits a connection request signal to the transceiver 200 of the transmission side. When the transceiver 200 of the transmission side receives the connection request signal, the transceiver 200 of the transmission side returns a connection response signal if connection is possible. When the transceiver 200 of the reception side receives the connection response signal, the transceiver 200 of the reception side returns a connection response signal to the transceiver 200 of the transmission side. When the transceiver 200 of the transmission side receives the connection response signal, a data communication session is started. When the communication of data is completed, a completion signal is transmitted from the transceiver 200 of the transmission side to the transceiver 200 of the reception side, and the transceiver 200 of the reception side enters a sleep mode.

Figure 3:
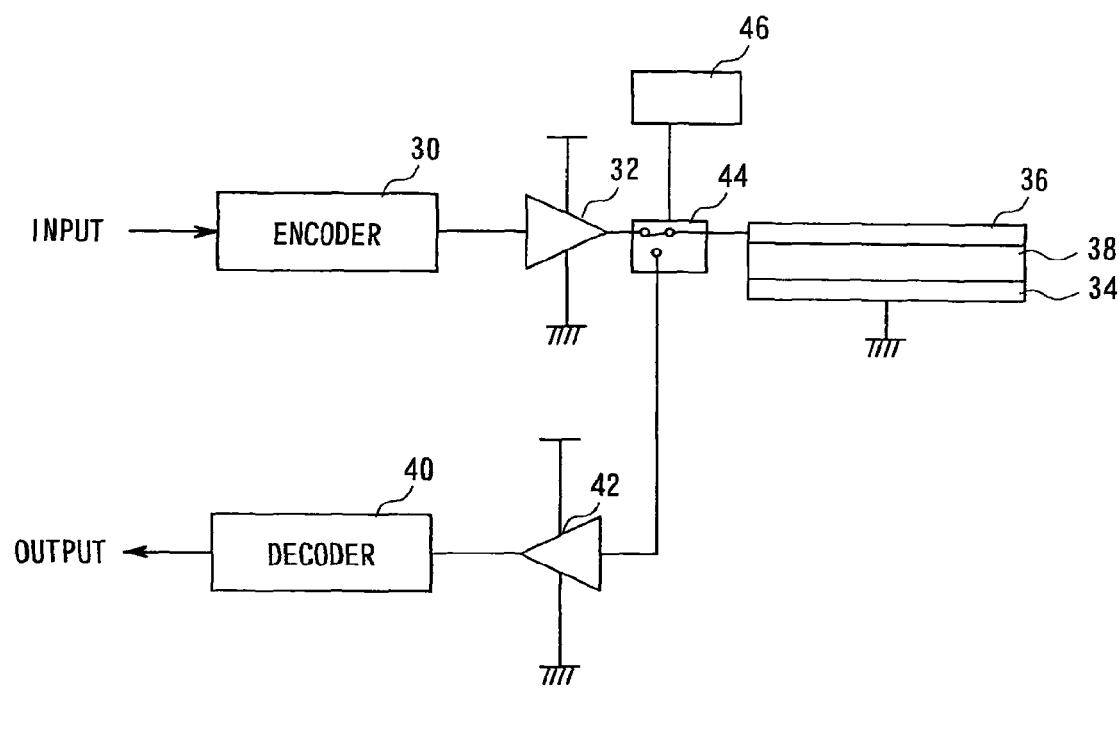
FIG. 3 is a diagram showing a structure of another configuration of a transceiver in a communication system of a preferred embodiment of the present invention.

Alternatively, the transceiver 200 may have a structure as shown in FIG. 3. In this structure, the transmission amplifier 32 comprises a single amplifier circuit. An output terminal of the encoder 30 is connected to an input terminal of the amplifier circuit, and an output terminal of the amplifier circuit is connected to the living body-side electrode 36 through the changeover switch 44. The environment-side electrode 34 is grounded. In the state where the output terminal of the transmission amplifier 32 is connected to the living body-side electrode 36 by the changeover switch 44, the transmission amplifier 32 amplifies a signal which is input from the encoder 30 and outputs the amplified signal to the living body-side electrode 36. A potential difference between the environment-side electrode 34 and the living body-side electrode 36 changes according to an output of the transmission amplifier 32. The reception amplifier 42 comprises a single amplifier circuit. An input terminal of the amplifier circuit is connected to the living body-side electrode 36 through the changeover switch 44, and an output terminal of the amplifier is connected to the decoder 40. The environment-side electrode 34 is grounded. In the state where the input terminal of the reception amplifier 42 is connected to the living body-side electrode 36 by the changeover switch 44, the reception amplifier 42 amplifies a signal which is input from the living body-side electrode 36 and outputs the amplified signal to the decoder 40. The decoder 40 decodes the output of the reception amplifier 42 using a decoding method corresponding to the encoding method used in the encoder 30 and outputs the decoded signal.

Figure 4:
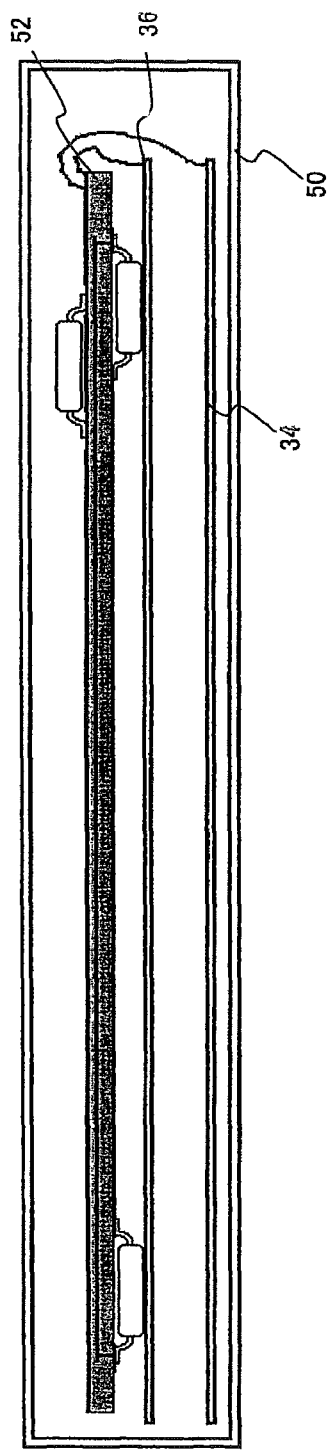
FIG. 4 is a diagram showing a placement of an environment-side electrode, a living body-side electrode, and a circuit board of a transceiver of a preferred embodiment of the present invention.

The transceiver 200 of the present embodiment is mounted in a housing 50 as shown in FIG. 4. Such a configuration is particularly preferable, for example, when the transceiver 200 is used as a portable communication terminal such as a portable phone and a PDA.

In FIG. 4, electronic circuits used in the transceiver 200 are mounted on a circuit board 52. In the present embodiment, at least the reception amplifier 42 is mounted on the circuit board 52. For example, the encoder 30, the transmission amplifier 32, the decoder 40, the reception amplifier 42, the changeover switch 44, and the controller 46 are mounted on the circuit board 52.

Figure 5:
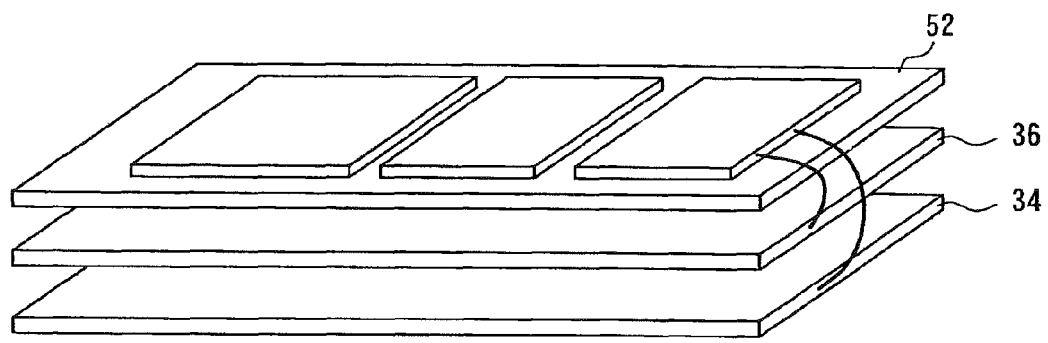
FIG. 5 is a diagram showing a placement of an environment-side electrode, a living body-side electrode, and a circuit board of a transceiver of a preferred embodiment of the present invention.

Here, the environment-side electrode 34, the living body-side electrode 36, and the circuit board 52 are placed in the housing 50. In the present embodiment, as shown in a perspective view of FIG. 5, the circuit board 52 is placed not in a location sandwiched between the environment-side electrode 34 and the living body-side electrode 36.

When the environment-side electrode 34 and the living body-side electrode 36 are plate-shaped electrodes and are placed opposing each other in a manner where at least a part of the electrodes overlap each other, the circuit board 52 is preferably placed at a position where the circuit board 52 is spatially hidden by at least a part of one of the electrodes from at least a part of the other electrode.

Figure 17A:
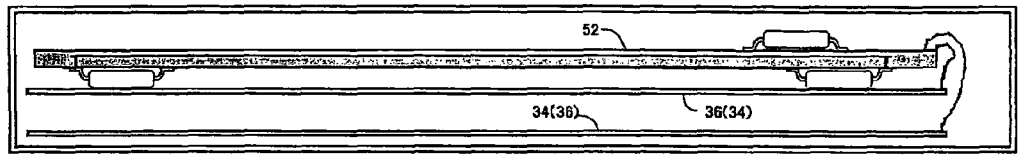
FIGS. 17A-17E are diagrams showing a placement of an environment-side electrode, a living body-side electrode, and a circuit board of a transceiver of a preferred embodiment of the present invention.
Figure 17B:
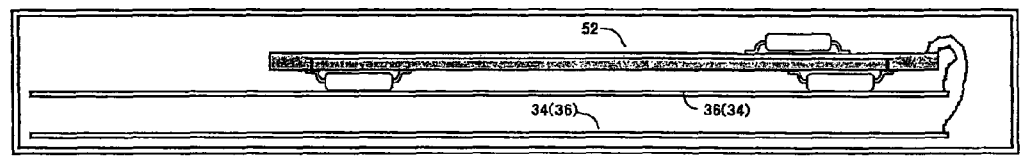
Figure 17C:
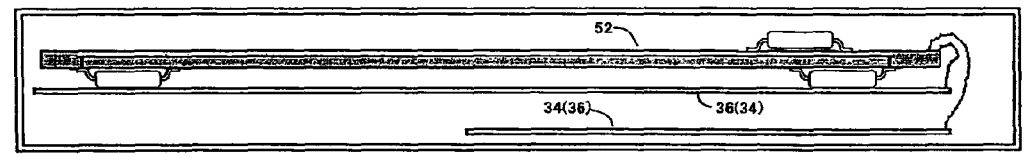
Figure 17D:
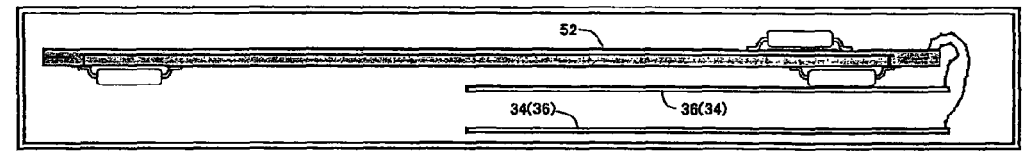

For example, as shown in FIG. 17A, preferably, a configuration is employed in which the circuit board 52, the environment-side electrode 34, and the living body-side electrode 36 are set to approximately the same size and the circuit board 52 is spatially hidden by one of the electrodes from the other electrode. Alternatively, as shown in FIG. 17B, preferably, a configuration is employed in which the environment-side electrode 34 and the living body-side electrode 36 are set to approximately the same size, the circuit board 52 is set to a size smaller than the environment-side electrode 34 and the living body-side electrode 36, and the circuit board 52 is spatially hidden by one of the electrodes from the other electrode. Alternatively, as shown in FIG. 17C, preferably, a configuration is employed in which one of the environment-side electrode 34 and the living body-side electrode 36 which is placed closer to the circuit board 52 is set to approximately the same size as the circuit board 52, the other electrode is set to a size smaller than the circuit board 52, and the circuit board 52 is spatially hidden by the one electrode from the other electrode. Alternatively, as shown in FIG. 17D, preferably, a configuration is employed in which the environment-side electrode 34 and the living body-side electrode 36 are set to approximately the same size, the circuit board 52 is set to a size larger than the environment-side electrode 34 and the living body-side electrode 36, and at least a part of the circuit board 52 is spatially hidden by one of the electrodes from the other electrode.

Figure 17E:
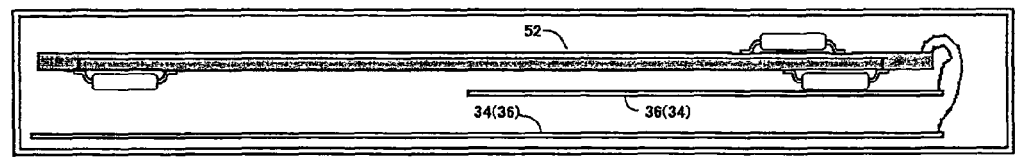

In a configuration as shown in FIG. 17E where one of the environment-side electrode 34 and the living body-side electrode 36 which is closer to the circuit board 52 is set to a size smaller than the circuit board 52 and the other electrode is set to a size larger than the circuit board 52, on the other hand, there is a portion where the circuit board 52 is not spatially hidden by one of the electrodes from the other electrode, and thus the obtained advantage is lower.

Figure 6:
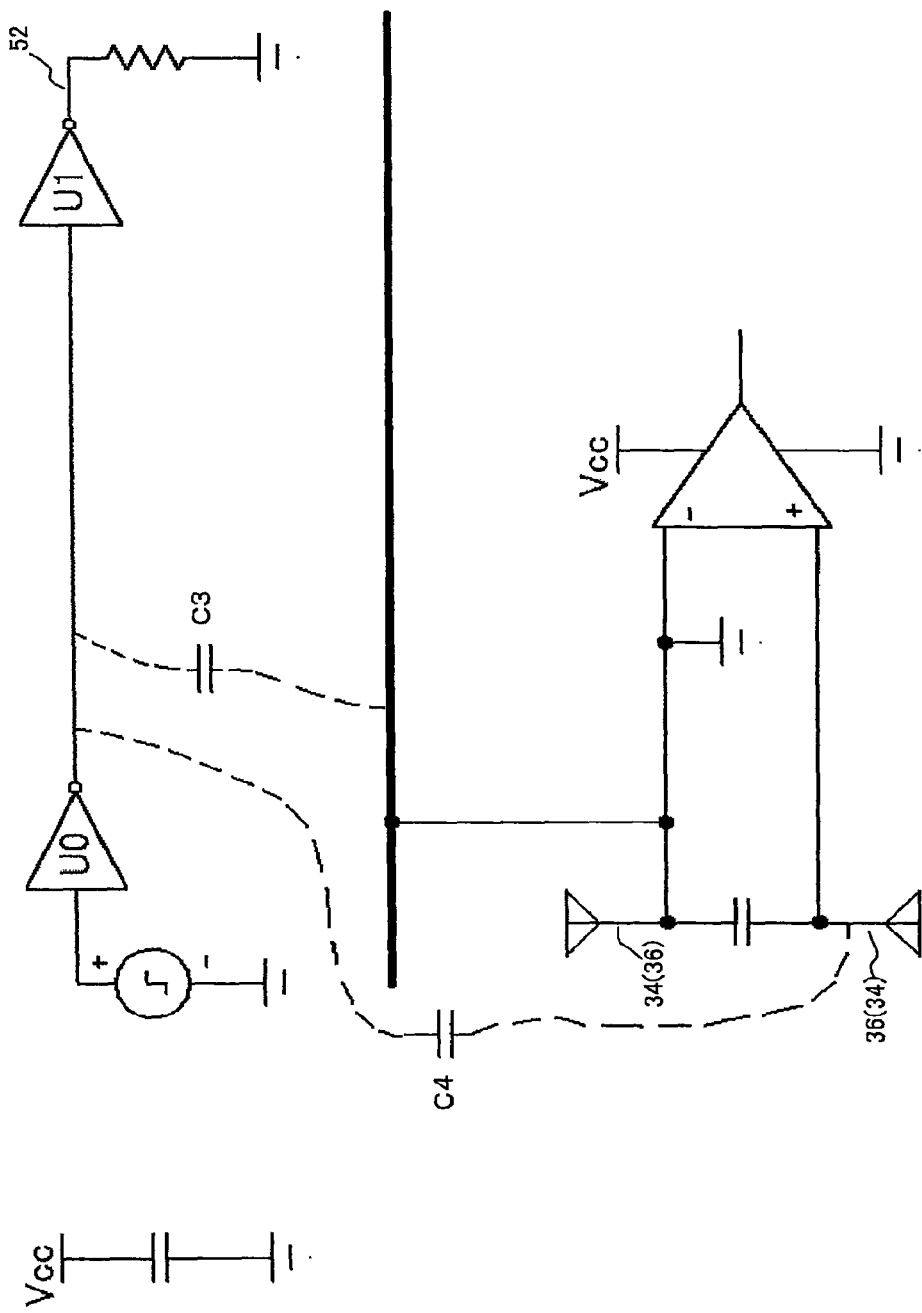
FIG. 6 is a diagram showing an equivalent circuit of an environment-side electrode, a living body-side electrode, and a circuit board of a transceiver of a preferred embodiment of the present invention.

By relatively placing the environment-side electrode 34, the living body-side electrode 36, and the circuit board 52 in a manner described above, as shown in FIG. 6, it is possible to block the circuit board 52 by one of the environment-side electrode 34 and the living body-side electrode 36, set a capacitive coupling C4 between the other electrode and the circuit board 52 to be smaller than the parasitic capacitances C1 and C2 in the structure of related art, and reduce the influence of the electromagnetic noise from the circuit board 52 on the other electrode.

Figure 7:
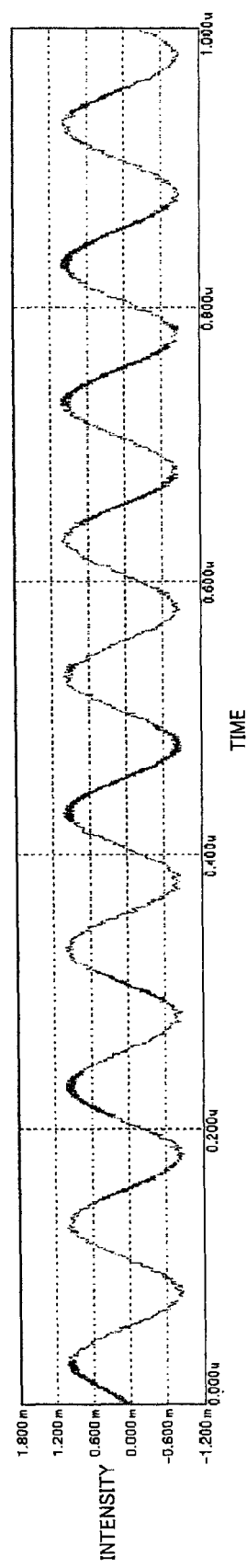
FIG. 7 is a diagram showing an example of a reception signal of a transceiver of a preferred embodiment of the present invention.
Figure 16A:
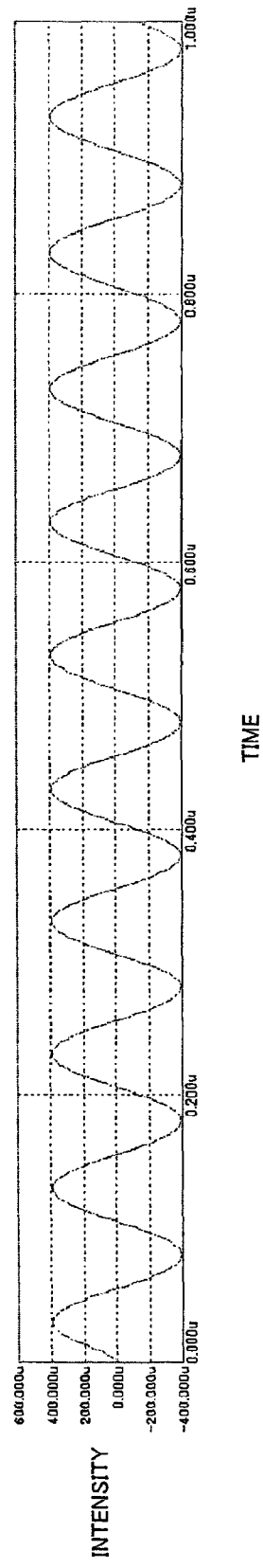
FIG. 16A is a diagram showing an example of a reception signal of a communication system of related art.
Figure 16B:
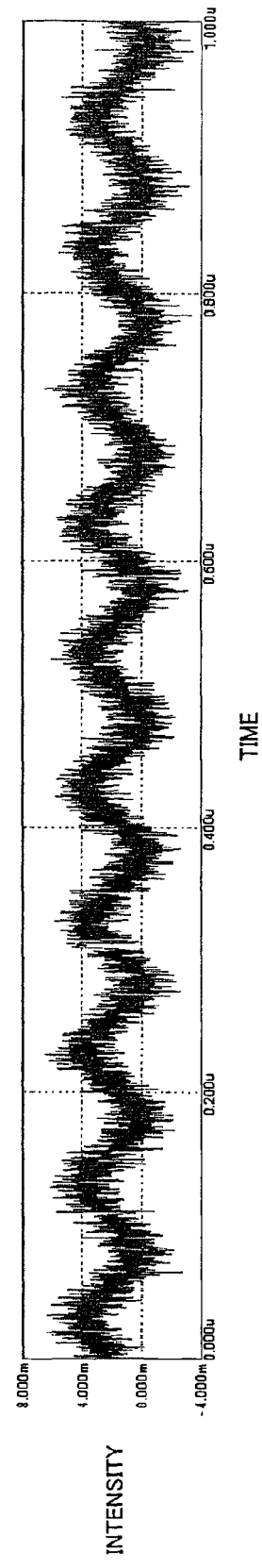
FIG. 16B is a diagram showing an example of a reception signal of a communication system of related art.

For example, in a circuit structure which shows reception signals of FIGS. 16A and 16B, if the structure is changed to a structure as in the present embodiment where the circuit board 52 is not sandwiched between the environment-side electrode 34 and the living body-side electrode 36, a reception signal as shown in FIG. 7 is obtained. The reception signal obtained in the structure of the present embodiment has a higher absolute intensity than the reception signal of FIG. 16A and an improved S/N ratio over the reception signal of FIG. 16B.

As described, by employing the structure of the transceiver 200 of the present embodiment, it is possible to improve the intensity of the reception signal at the reception and to improve S/N ratio of the reception signal.

Figure 18A:
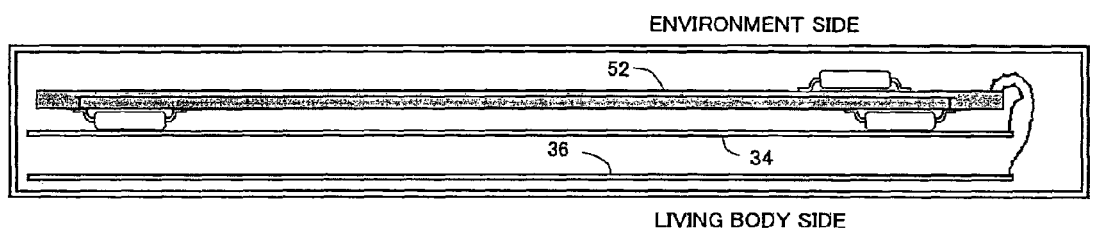
FIGS. 18A and 18B are diagrams showing a usage form of a transceiver of a preferred embodiment of the present invention.
Figure 18B:
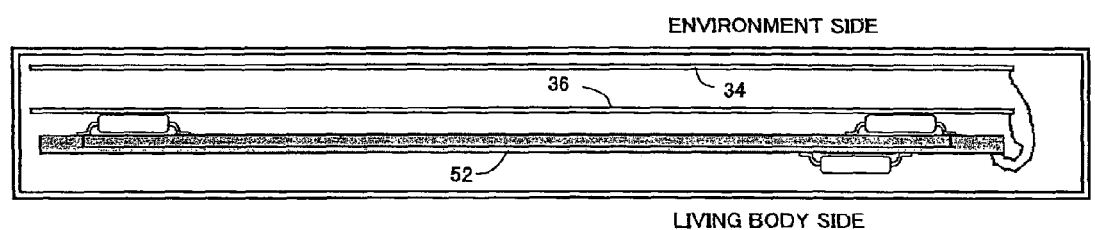

As shown in FIG. 18A, the electrode which is placed nearer to the circuit board 52 may be set as the environment-side electrode 34 and the other electrode may be set as the living body-side electrode 36. Alternatively, as shown in FIG. 18B, the electrode placed nearer to the circuit board 52 may be set as the living body-side electrode 36 and the other electrode maybe set as the environment-side electrode 34. In these configurations, the phase of the reception signal during usage would be inverted. However, by applying a modulation method which does not depend on phase inversion such as PSK, FSK, and ASK, it is possible to use in the reverse direction. In other words, the names of the environment-side electrode 34 and the living body-side electrode 36 are only for the purpose of convenience, and the electrodes may be used in the opposite configuration.

Figure 19:
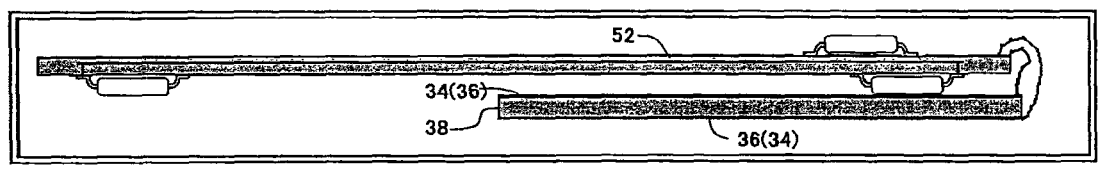
FIG. 19 is a diagram showing a placement of an environment-side electrode, a living body-side electrode, and a circuit board of a transceiver of a preferred embodiment of the present invention.

As shown in FIG. 19, the dielectric layer 38 which functions as an antenna and which is sandwiched between the environment-side electrode 34 and the living body-side electrode 36 is not limited to a resin such as epoxy, and an insulating material similar to the circuit board 52 or a foam resin having a low dielectric constant may be used.

Figure 20:
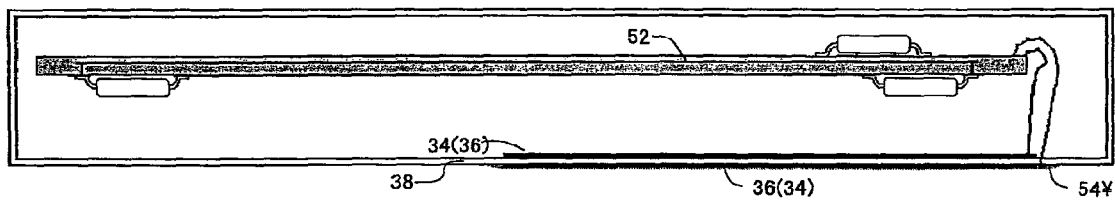
FIG. 20 is a diagram showing a placement of an environment-side electrode, a living body-side electrode, and a circuit board of a transceiver of a preferred embodiment of the present invention.

When the housing of the electronic device such as the portable phone is made of an insulating member, as shown in FIG. 20, a structure may be employed in which the housing itself is used as the dielectric layer 38 and sandwiched by the environment-side electrode 34 and the living body-side electrode 36. In this case, it is also preferable to cover the electrode which is placed outside of the housing with an insulating film 54. With such a structure, it is possible to improve the degree of freedom of placement of the members in the housing.

In the present embodiment, a transceiver 200 having both the transmission system and reception system is exemplified, but the present invention is not limited to such a configuration, and may be applied to a communication system in which a transmitter of a transmission system and a receiver of a reception system are separately formed.

Figure 8:
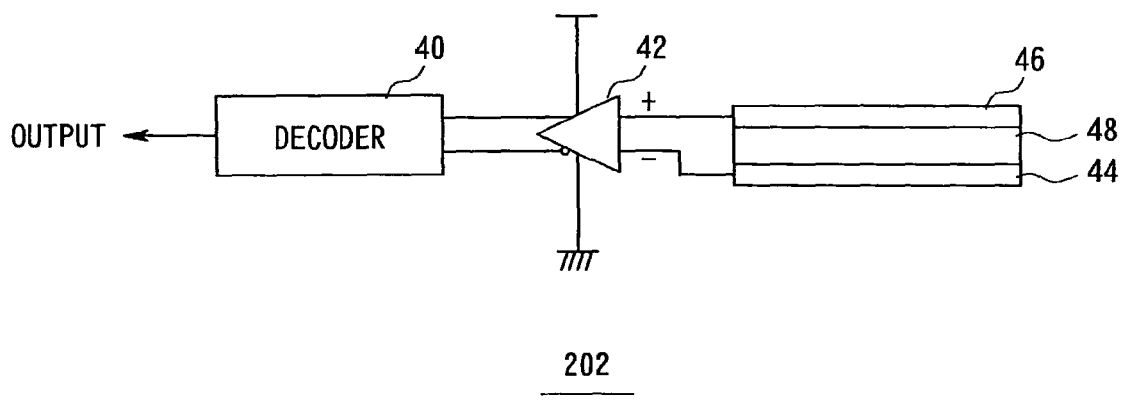
FIG. 8 is a diagram showing a structure of a receiver of a communication system in a preferred embodiment of the present invention.
Figure 9:
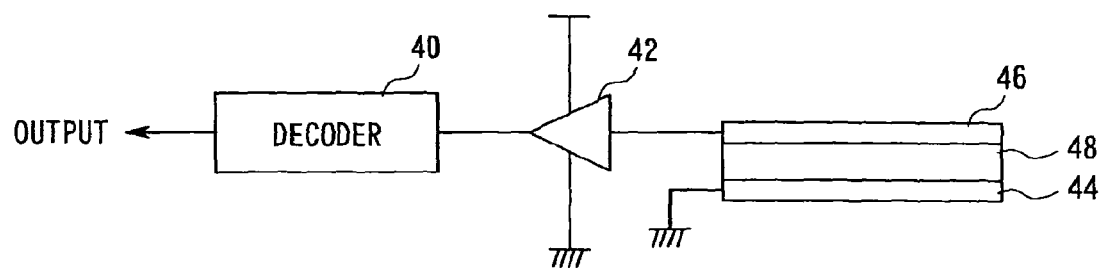
FIG. 9 is a diagram showing a structure of another example configuration of a receiver of a communication system of a preferred embodiment of the present invention.
Figure 10A:
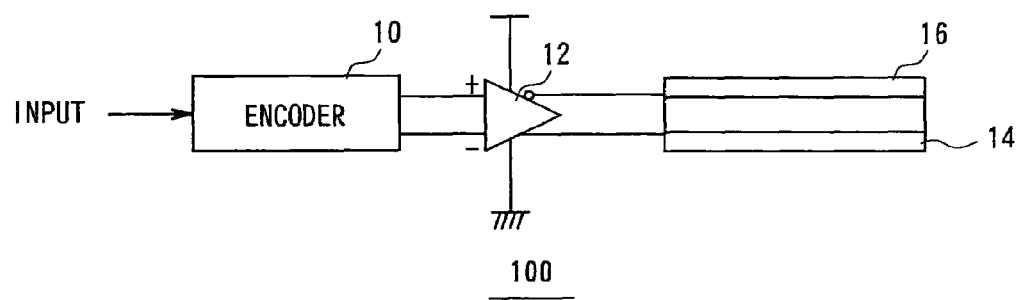
FIG. 10A is a diagram showing a structure of a transmitter in a communication system of related art.
Figure 10B:
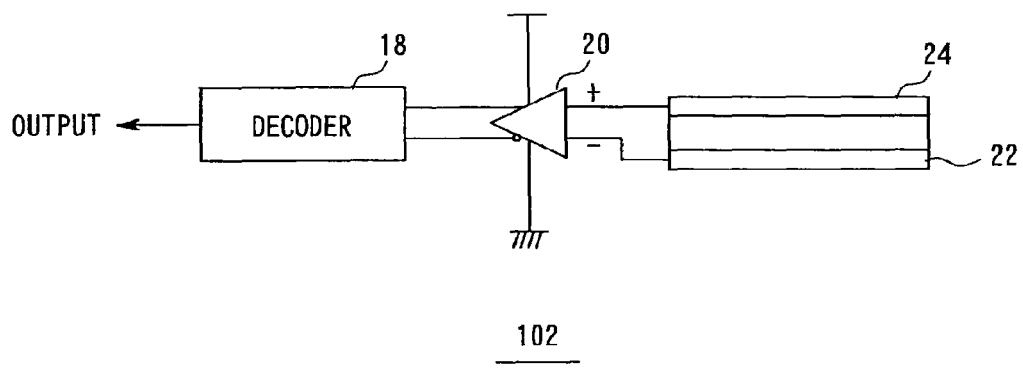
FIG. 10B is a diagram showing a structure of a receiver in a communication system of related art.
Figure 11:
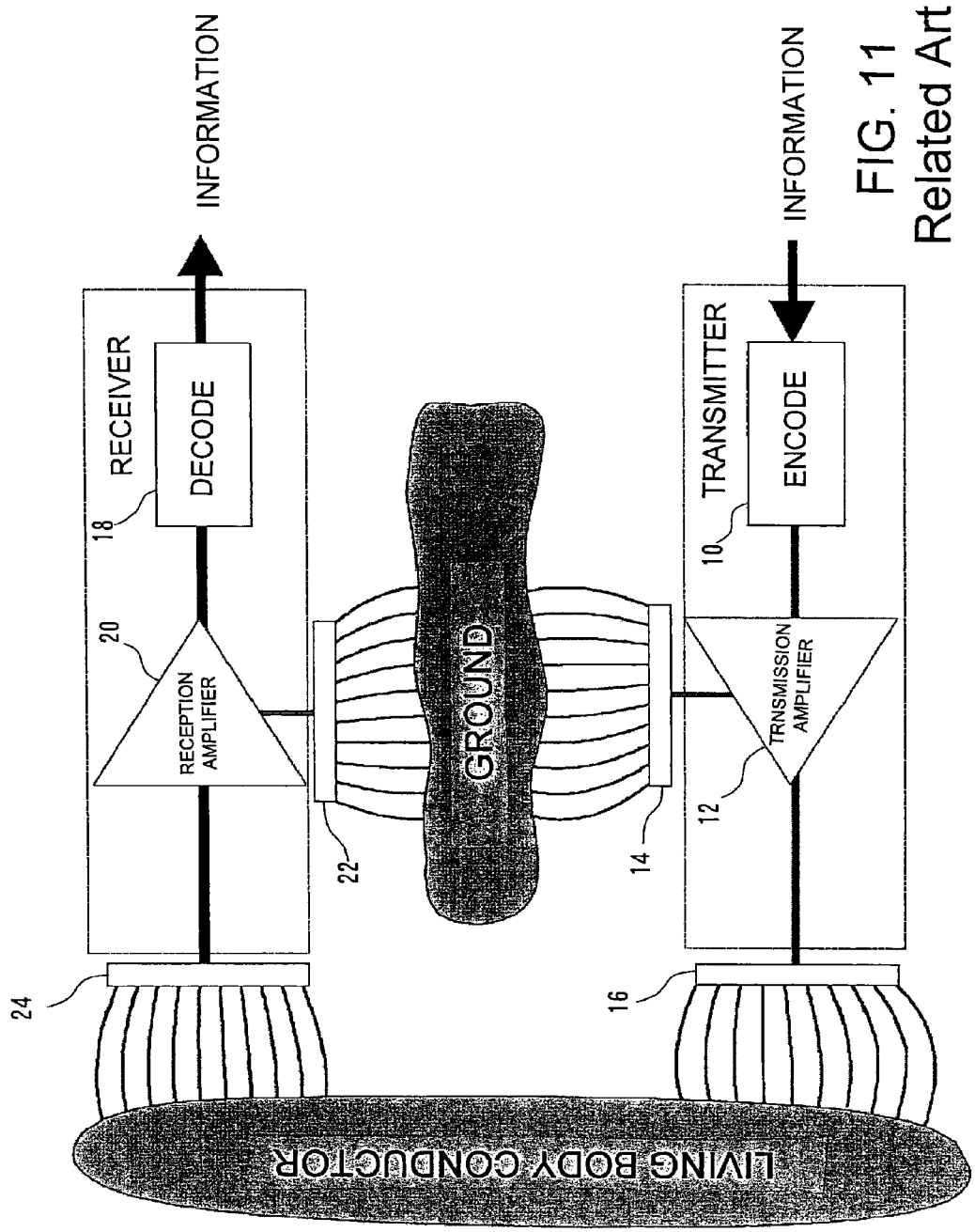
FIG. 11 is a diagram showing an example of formation of an electric field when a communication system is used.
Figure 12:
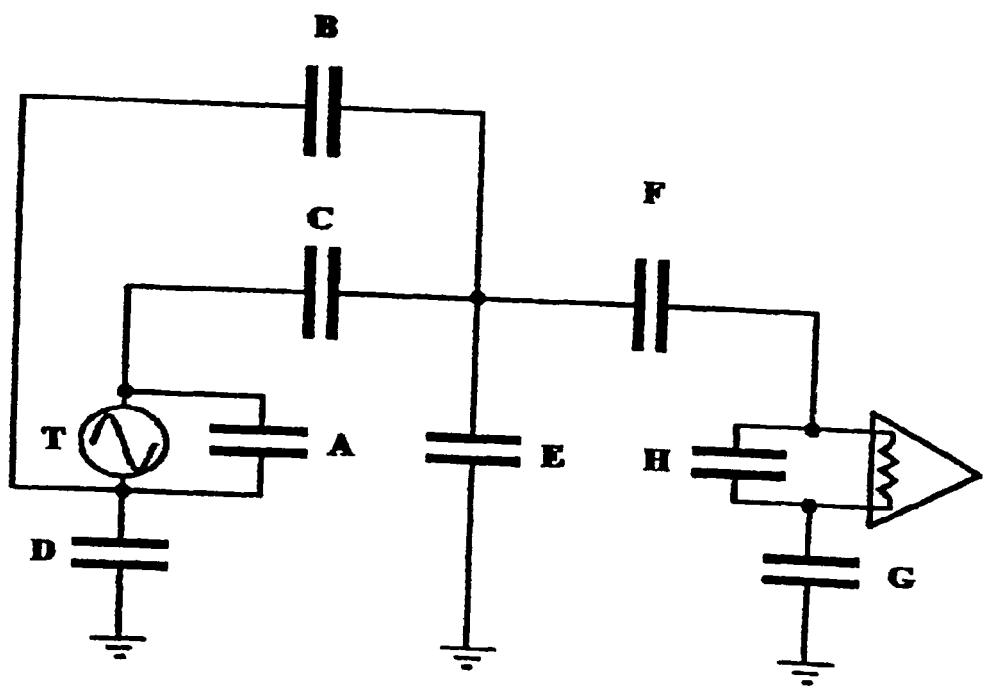
FIG. 12 is a diagram showing an equivalent circuit of a capacitive coupling formed in a communication system.
Figure 13:
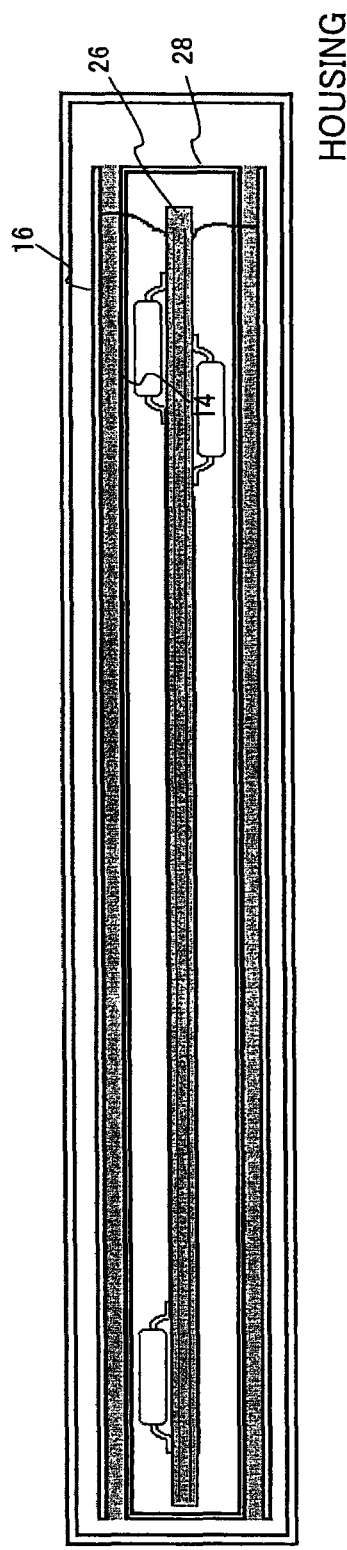
FIG. 13 is a diagram showing a placement of an environment-side electrode, a living body-side electrode, and a circuit board in a transceiver of related art.
Figure 14:
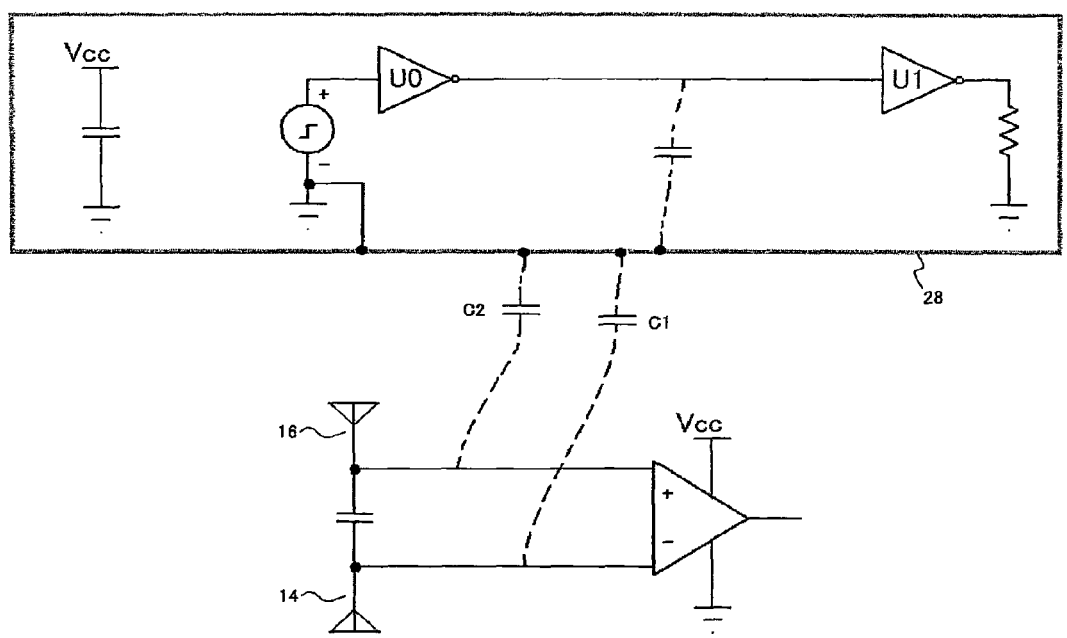
FIG. 14 is a diagram showing an equivalent circuit of an environment-side electrode, a living body-side electrode, and a circuit board in a transceiver of related art.
Figure 15:
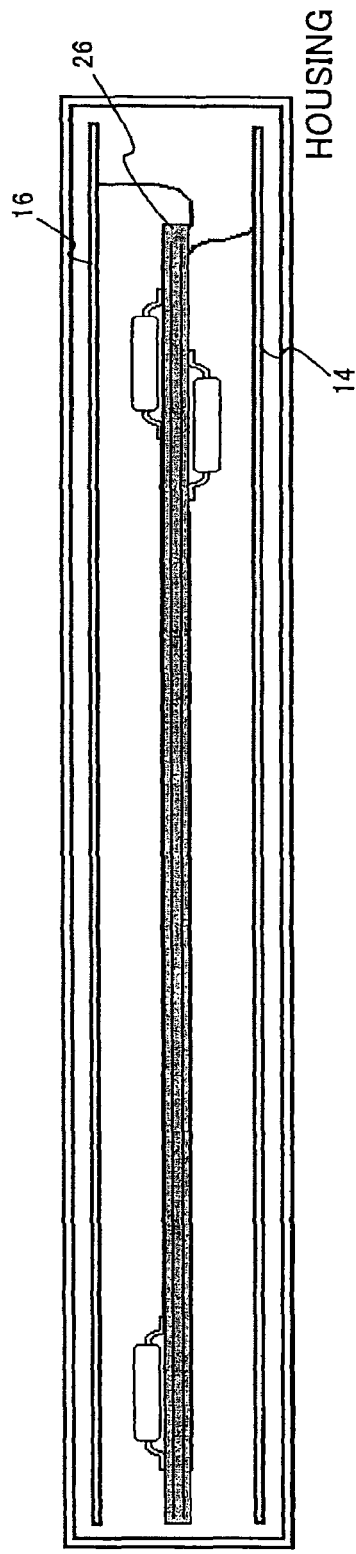
FIG. 15 is a diagram showing another example placement of an environment-side electrode, a living body-side electrode, and a circuit board in a transceiver of related art.

Specifically, as shown in FIG. 8, in a receiver 202 comprising an environment-side electrode 44, a living body-side electrode 46, a decoder 40, and a reception amplifier 42, the circuit board may be provided not sandwiched between the environment-side electrode 44 and the living body-side electrode 46, to obtain similar advantages. Alternatively, as shown in FIG. 9, a configuration may be employed in which the reception amplifier 42 is changed from the differential amplifier circuit to a single amplifier circuit.

What is claimed is:

1. A communication system for enabling communication between a transmitter which is portable and a receiver which is fixed, using a capacitive coupling through a living body, wherein
   the receiver comprises:
   a living body-side electrode which primarily capacitively couples with a living body;
   an environment-side electrode which primarily capacitively couples with an external environment; and
   a circuit board on which a circuit which processes a signal which is output from at least one of the living body-side electrode and the environment-side electrode is mounted, and
   the circuit board is not placed between the living body-side electrode and the environment-side electrode.

2. The communication system according to claim 1, wherein
   the living body-side electrode and the environment-side electrode are plate-shaped electrodes, and are placed opposing each other so that at least a part of the electrodes overlap each other.

3. The communication system according to claim 2, wherein
   the circuit board is placed so that the circuit board overlaps at least a part of the living body-side electrode and the environment-side electrode.

4. The communication system according to claim 1, wherein
   the circuit includes a differential amplifier circuit which amplifies a potential difference between the living body-side electrode and the environment-side electrode.

5. A portable receiver which is used in a communication system for enabling communication between a transmitter which is portable and a receiver which is fixed, using a capacitive coupling through a living body, the receiver comprising:
   a living body-side electrode which primarily capacitively couples with a living body;
   an environment-side electrode which primarily capacitively couples with an external environment; and
   a circuit board on which a circuit which processes a signal which is output from at least one of the living body-side electrode and the environment-side electrode is mounted, wherein the circuit board is not placed between the living body-side electrode and the environment-side electrode.

* * * * *